(12) United States Patent
Dasanayaka

(10) Patent No.: US 10,897,071 B2
(45) Date of Patent: Jan. 19, 2021

(54) UNIVERSAL ADAPTER PLATE ASSEMBLY

(71) Applicants: TIMCO AVIATION SERVICES, INC., Greensboro, NC (US); Vipula Dasanayaka, Greensboro, NC (US)

(72) Inventor: Vipula Dasanayaka, Greensboro, NC (US)

(73) Assignee: HAECO Americas, LLC, Greensboro, NC (US)

( * ) Notice: Subject to any disclaimer, the term of this patent is extended or adjusted under 35 U.S.C. 154(b) by 1006 days.

(21) Appl. No.: 14/760,764

(22) PCT Filed: Jan. 9, 2014

(86) PCT No.: PCT/US2014/010788
§ 371 (c)(1),
(2) Date: Jul. 14, 2015

(87) PCT Pub. No.: WO2014/113261
PCT Pub. Date: Jul. 24, 2014

(65) Prior Publication Data
US 2016/0190675 A1 Jun. 30, 2016

Related U.S. Application Data

(60) Provisional application No. 61/753,052, filed on Jan. 16, 2013.

(51) Int. Cl.
| | |
|---|---|
| *H01Q 1/12* | (2006.01) |
| *B64C 1/36* | (2006.01) |
| *H01Q 1/28* | (2006.01) |
| *F16B 5/02* | (2006.01) |
| *E05D 7/04* | (2006.01) |

(52) U.S. Cl.
CPC ............... *H01Q 1/125* (2013.01); *B64C 1/36* (2013.01); *E05D 7/0423* (2013.01); *F16B 5/0233* (2013.01); *H01Q 1/1207* (2013.01); *H01Q 1/28* (2013.01)

(58) Field of Classification Search
CPC ..... Y10T 403/32008; Y10T 403/32213; Y10T 403/32918; F16D 3/38; F16D 3/40; H01Q 1/125; H01Q 1/1207; H01Q 1/28; B64C 1/36
USPC ...................................... 403/58, 79
See application file for complete search history.

(56) References Cited

U.S. PATENT DOCUMENTS

| | | | | |
|---|---|---|---|---|
| 541,997 A | * | 7/1895 | Fravega et al. | F16D 3/38 464/119 |
| 2,669,316 A | * | 2/1954 | Schjolin | B60K 5/04 180/292 |

(Continued)

FOREIGN PATENT DOCUMENTS

| | | | | |
|---|---|---|---|---|
| EP | 1401049 A1 | * | 3/2004 | ............. H01Q 1/125 |
| FR | 2824957 A1 | * | 11/2002 | ............. H01Q 1/228 |

(Continued)

*Primary Examiner* — Jonathan P Masinick
(74) *Attorney, Agent, or Firm* — MacCord Mason PLLC

(57) ABSTRACT

The assembly comprises an adjustable zero-moment support having an upper fitting and a lower fitting configured together with an off-axis adjustment. The assembly may have an adapter and support assembly that includes an external fitting, an adapter plate and an adjustable zero-moment support.

19 Claims, 6 Drawing Sheets

(56) References Cited

U.S. PATENT DOCUMENTS

| | | | | |
|---|---|---|---|---|
| 2,697,577 | A | * | 12/1954 | Wolf .................. B60Q 1/245 248/278.1 |
| 2,803,474 | A | * | 8/1957 | Hart .................... F16D 1/108 403/336 |
| 3,401,964 | A | * | 9/1968 | Johnson ............. F16C 11/0614 384/203 |
| 3,789,414 | A | | 1/1974 | Bauer et al. ............ H01Q 3/12 |
| 3,800,557 | A | * | 4/1974 | Tobin .................... F16D 3/78 464/94 |
| 3,893,123 | A | | 7/1975 | Bieser ..................... H01Q 3/00 |
| 3,923,349 | A | * | 12/1975 | Herbst ............... F16C 11/0614 384/215 |
| 3,999,184 | A | | 12/1976 | Fuss, III ................. H01Q 3/08 |
| 4,382,624 | A | * | 5/1983 | Lysenko ................ B66C 3/005 294/119.4 |
| 4,561,797 | A | * | 12/1985 | Aldridge ............... A01D 75/30 172/314 |
| 4,596,989 | A | | 6/1986 | Smith et al. ............ H01Q 1/18 |
| 4,621,266 | A | | 11/1986 | Le Gall et al. ......... H01Q 3/00 |
| 4,702,722 | A | * | 10/1987 | Narue .................... F16D 3/40 464/134 |
| 5,198,830 | A | * | 3/1993 | Lin ....................... H01Q 1/125 248/183.2 |
| 5,393,162 | A | * | 2/1995 | Nissen ................... B66D 3/04 294/82.1 |
| 6,404,400 | B1 | * | 6/2002 | Tulloch ................. H01Q 1/125 343/765 |
| 7,339,549 | B2 | * | 3/2008 | Maxwell ............. H01Q 1/1221 248/218.4 |
| 7,369,672 | B2 | * | 5/2008 | Hirschhorn .......... F16M 11/041 248/917 |
| 7,438,492 | B2 | * | 10/2008 | Naudet .................... F16C 7/06 403/374.1 |
| 7,686,529 | B1 | * | 3/2010 | Le .......................... B64G 1/646 403/78 |
| 7,954,777 | B2 | * | 6/2011 | Bohm .................... F16M 11/10 248/274.1 |
| 7,971,840 | B2 | * | 7/2011 | Hirschhorn .......... F16M 11/041 248/123.11 |
| 8,187,105 | B2 | * | 5/2012 | Jaworowicz ............ F16D 1/033 29/525.01 |
| 8,196,883 | B2 | * | 6/2012 | Hirschhorn .......... F16M 11/041 248/274.1 |
| 8,974,375 | B2 | * | 3/2015 | Yang ..................... A61B 1/008 600/137 |
| 2003/0235320 | A1 | * | 12/2003 | Hirschhorn .......... F16M 11/041 381/333 |
| 2008/0197256 | A1 | * | 8/2008 | Hirschhorn .......... F16M 11/041 248/276.1 |
| 2009/0002261 | A1 | * | 1/2009 | Bohm .................... F16M 11/10 343/882 |
| 2009/0267860 | A1 | * | 10/2009 | Peng ................... H01Q 1/1228 343/878 |
| 2010/0190560 | A1 | * | 7/2010 | Jaworowicz ............ F16D 1/033 464/150 |
| 2011/0226918 | A1 | * | 9/2011 | Hirschhorn .......... F16M 11/041 248/278.1 |

FOREIGN PATENT DOCUMENTS

| | | | | |
|---|---|---|---|---|
| JP | | 06227274 A | * 8/1994 | |
| WO | WO-2007121393 A2 | * 10/2007 | ............. F16M 11/05 |

* cited by examiner

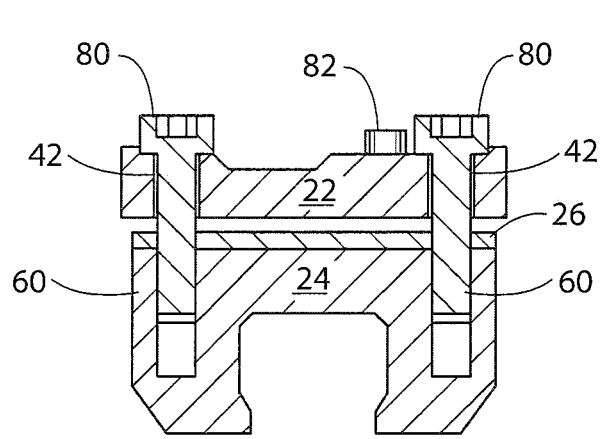
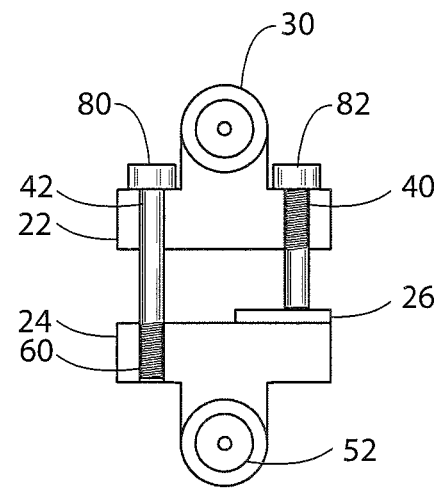
FIG. 4A        FIG. 4B
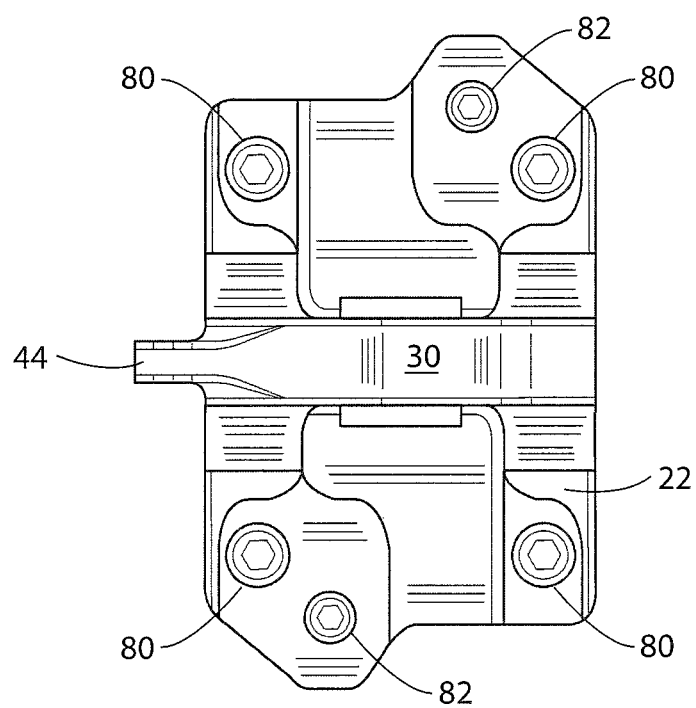
FIG. 5

UNIVERSAL ADAPTER PLATE ASSEMBLY

This application claims the benefit of U.S. provisional application No. 61/753,052, filed Jan. 16, 2013, which is incorporated herein by reference in its entirety.

BACKGROUND

Field

The present inventions relate generally to linkage assemblies, and more particularly, to an improved universal adapter plate support assembly for an aircraft.

Related Art

Linkage assemblies often mechanically connect a work implement to a body or frame-like support. Generally, a linkage assembly includes any number of mechanical connections coupled to the frame opposite the work implement. One such particular application is linkage to connect two points to provide support for the work implement and transfer a particular load. However, where distance and space are limited, these traditional linkages make installation/maintenance tedious and problematic.

One exemplary application of connection between two points to transfer load from a work implement is supporting an antenna assembly, for instance within the spatially-confined clearances in a radome on an aircraft. Typically, a radome is a curved, shell-like member used to enclose or otherwise protect antenna equipment and the like, for example on an aircraft. Depending on the type of aircraft with which the radome is being used, the radome may be a variety of shapes, styles and sizes. Further, the radome is usually constructed of materials strong enough to withstand the aerodynamic forces to which it is subjected during flight, and is attached to, for instance, the nose of the craft to withstand the substantial forces during flight.

Traditional installation of a linkage assembly between the aircraft and the outside mechanical component (i.e. antenna assembly components) is a difficult and tedious, trial and error procedure, where maintenance engineers shim-to-fit components during a fitting. The result is a slow process, often taking weeks for installation due to subjective human judgments.

SUMMARY

In accordance with the present inventions, an improved adapter plate assembly is provided for universal mounting. The present inventions provide an improved adapter and support assembly that are convenient, efficient, and secure, particularly when used on aircraft. The present inventions may also allow for a method of assembling an antenna assembly with the improved adapter plate. The present inventions may also provide a kit of materials for assembling a universal improved adapter plate assembly.

One aspect of the present inventions is to provide adjustable zero-moment support for transferring load with an off-axis adjustment comprising an upper fitting and a lower fitting. Typically, the upper fitting and the lower fitting are positioned together with an off-axis adjustment. The upper fitting may include a link assembly. In some examples, the link assembly is a link chosen from a spherical bearing, a fork bearing and a combination thereof. For instance, the link assembly may be a spherical bearing having roller bearings. The upper fitting may include at least one threaded aperture and at least one non-threaded aperture. The at least one threaded aperture may be adapted to exert compression on the assembly. The at least one non-threaded aperture may be adapted to exert tension on the assembly. For example, the upper fitting may include four threaded apertures and two non-threaded apertures.

In particular examples, the upper fitting may include a guide fin. The upper fitting may include a connecting face. In particular examples, the connecting face may include at least one guide pin. The lower fitting may include a link assembly. The link assembly may be a link chosen from a spherical bearing, a fork bearing and a combination thereof. In particular examples, the link assembly may be a fork bearing having opposing spatially separated bearing forks. The lower fitting may include at least one threaded aperture. In some examples, the at least one threaded aperture, including four threaded apertures, and may be adapted to exert tension on the assembly. The lower fitting may also include a connecting face.

In some examples, the assembly includes a compression bearing plate. The compression bearing plate may include a plurality of tension apertures. For instance, the plurality of tension apertures are adapted to allow tension fasteners to protrude through the compression bearing plate. Further, the compression bearing plate may include at least one compression bearing platform sites. The compression bearing plate may include two compression bearing platform sites. In addition, a guide pin may be fixed either to the upper fitting or to the lower fitting. The compression bearing plate may also include a guide pin aperture that is adapted to receive a corresponding guide pin.

The assembly constructed according to the present inventions may include at least one tension fastener and at least one compression fastener to fasten the assembly into an adjustable zero-moment support. For example, assembly may include two compression bolts and four tension bolts.

Another aspect of the present inventions is to provide an adapter and support assembly for connecting two mounting points to transfer load, for example in a spatially confined area, having an external fitting, an adapter plate and an adjustable zero-moment support. The assembly may include an antenna assembly. In some examples, the antenna assembly includes an aircraft antenna. A radome may be positioned on an aircraft. A skirt may fit over the radome. A seal may seal the radome to the skin of the aircraft. In other examples, the assembly includes antenna cables, a receiver transmitter, and the antenna assembly may be generally adapted to move independently during pressurization.

In yet another aspect of the present inventions, an adapter and support assembly includes an external fitting; an adapter plate; an adjustable zero-moment support having an upper fitting and a lower fitting, wherein the upper fitting and the lower fitting are positioned together with an off-axis adjustment. Further, the adapter and support assembly may include an antenna assembly.

The above summary is intended to summarize certain embodiments of the present inventions. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the inventions will be better understood by a reading of the Description of Embodiments along with a review of the drawings, in which:

FIG. 4A is a cross-sectional view of the adjustable zero-moment support embodiment in FIG. 2;

FIG. 4B is an isolated, cross-sectional view of the adjustable zero-moment support embodiment in FIG. 2 with elements removed for clarity;

FIG. 5 is a top view of the adjustable zero-moment support embodiment in FIG. 2;

DESCRIPTION OF THE EMBODIMENTS

Figure 1A:
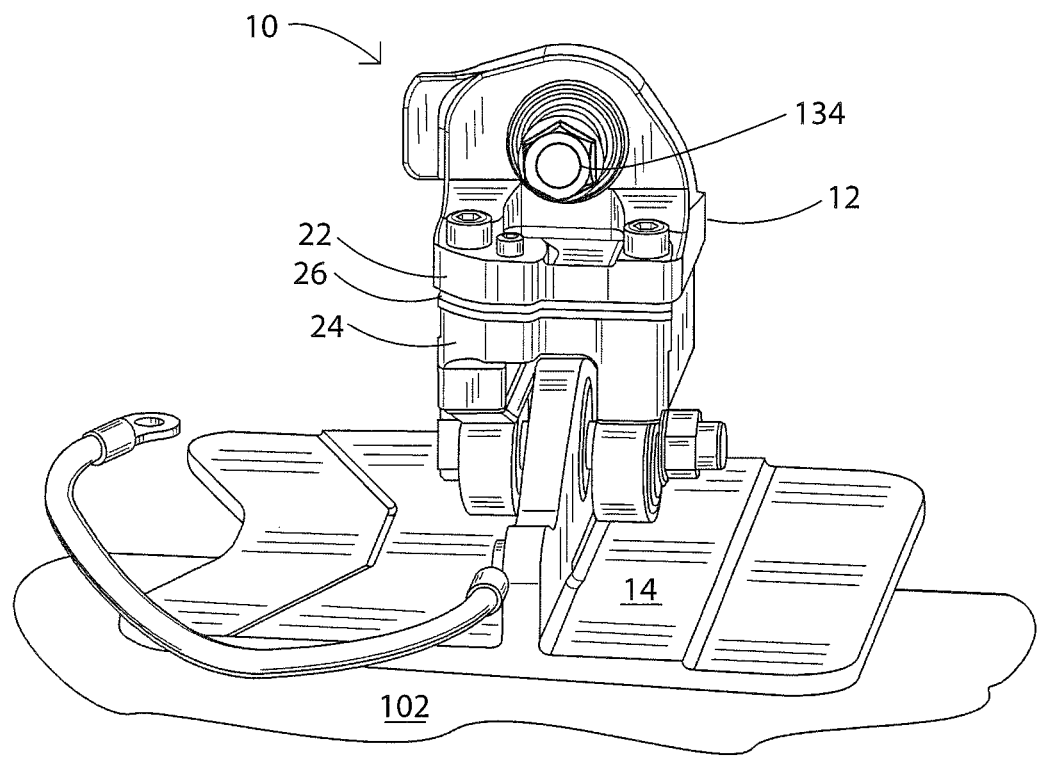
FIG. 1A is side perspective view of an adapter assembly positioned on an aircraft constructed according to an embodiment of the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1B:
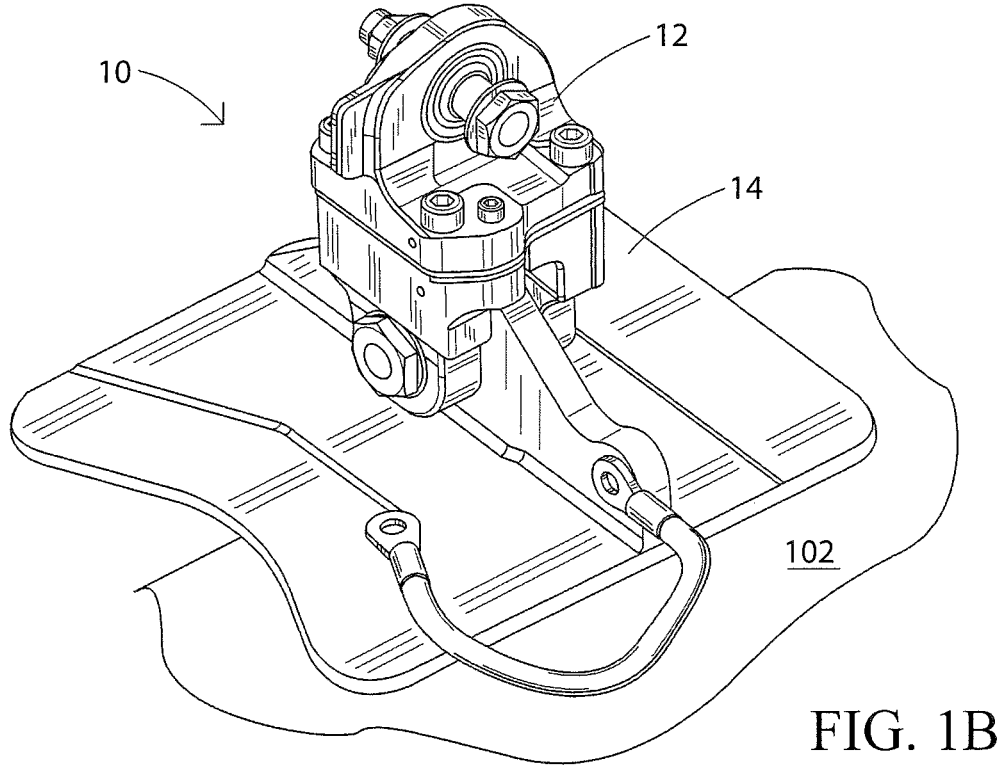
FIG. 1B is another side perspective view of an adapter assembly positioned on an aircraft constructed according to an embodiment of the present inventions.
Figure 2:
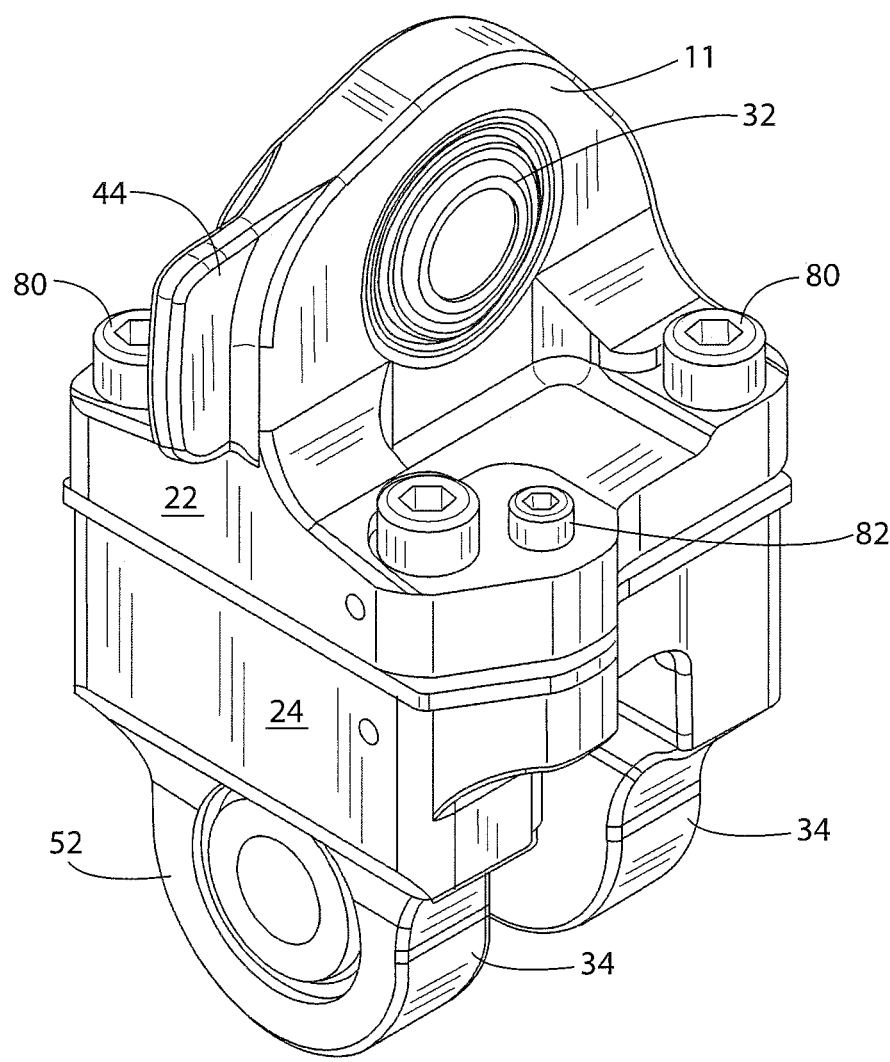
FIG. 2 is a side perspective view of the adjustable zero-moment support embodiment introduced FIG. 1.

Referring now to the drawings in general and FIGS. 1A and 1B in particular, it will be understood that the illustrations are for the purpose of describing embodiments of the inventions and are not intended to limit the disclosure or any inventions thereto. As seen in FIGS. 1A, 1B and 2, an adapter support assembly 10 is shown embodied according to the present inventions. An adapter support assembly 10 may include an external fitting, for instance an aircraft side fitting, an adapter plate 14, and an adjustable zero-moment support 12. FIGS. 1A and 1B show the adjustable zero-moment support 12 generally connects two points to transfer load where distance and height is limited, i.e. in a spatially confined area. In particular examples, the adapter support assembly 10 is used to support an antenna assembly. For instance, the adapter support assembly 10 may support an antenna assembly on the exterior of an aircraft 102.

As shown in FIG. 2, the adjustable zero-moment support 12 includes an upper fitting 22 body and a lower fitting 24 body that are attached together to create a zero moment assembly. The zero moment assembly allows the external hard elements (e.g. in the antenna assembly or the like) to move independently during changes in pressure and/or altitude. Therefore, the adjustable zero-moment supports described herein allow the antenna elements, for example, to move independently and not fight each other to cause damage while at pressure in altitude and when the aircraft is pressurized. The upper fitting 22 and a lower fitting 24 may constructed of a variety of rigid materials. In particular examples, the upper fitting 22 and a lower fitting 24 are made of aluminum for a rigid and lightweight application on an aircraft. In this particular example, the adjustable zero-moment support 12 supports about two thousand to about six thousand pounds, including about three thousand to about five thousand pounds of load. However, other examples will transfer greater and less loads while providing the adjustability as described herein. As discussed hereinafter, the attached upper fitting 22 and lower fitting 24 produce an off-axis adjustment capability that is useful in a variety of tight-fitting applications, including antenna assembly support on an aircraft or the like.

The upper fitting 22 typically includes a link assembly 30 to form half of the adjustable zero-moment support as illustrated. As shown, the link assembly 30 may be a spherical linkage 32; however other examples include a link assembly 30 having a fork bearing or the like. The upper fitting also includes a variety of apertures that receive fasteners (as later shown and described in FIG. 7). As shown in FIG. 2, four tension fasteners 80 (with one being hidden from view) secure the upper fitting 22 to the lower fitting 24 through these apertures. In one example, the tension fasteners 80 are socket head cap screws and are tightened to about three inch per pound torque. The upper fitting also includes at least one compression fastener 82. In some examples, the upper fin 22 may include a guide fin 44 which may generally minimize, or eliminate, rotation of the link assembly 30 to generally protect elements from damage during its use.

The lower fitting 24 also includes a link assembly 52. As seen in FIG. 2, the link assembly 52 may be a fork bearing 34; however, other embodiments include spherical bearings and the like. The link assemblies herein may include a variety of bearings, bushings and the like to meet the particular application. For instance, one example of the spherical bearing includes a roller or swage bearing.

Figure 3:
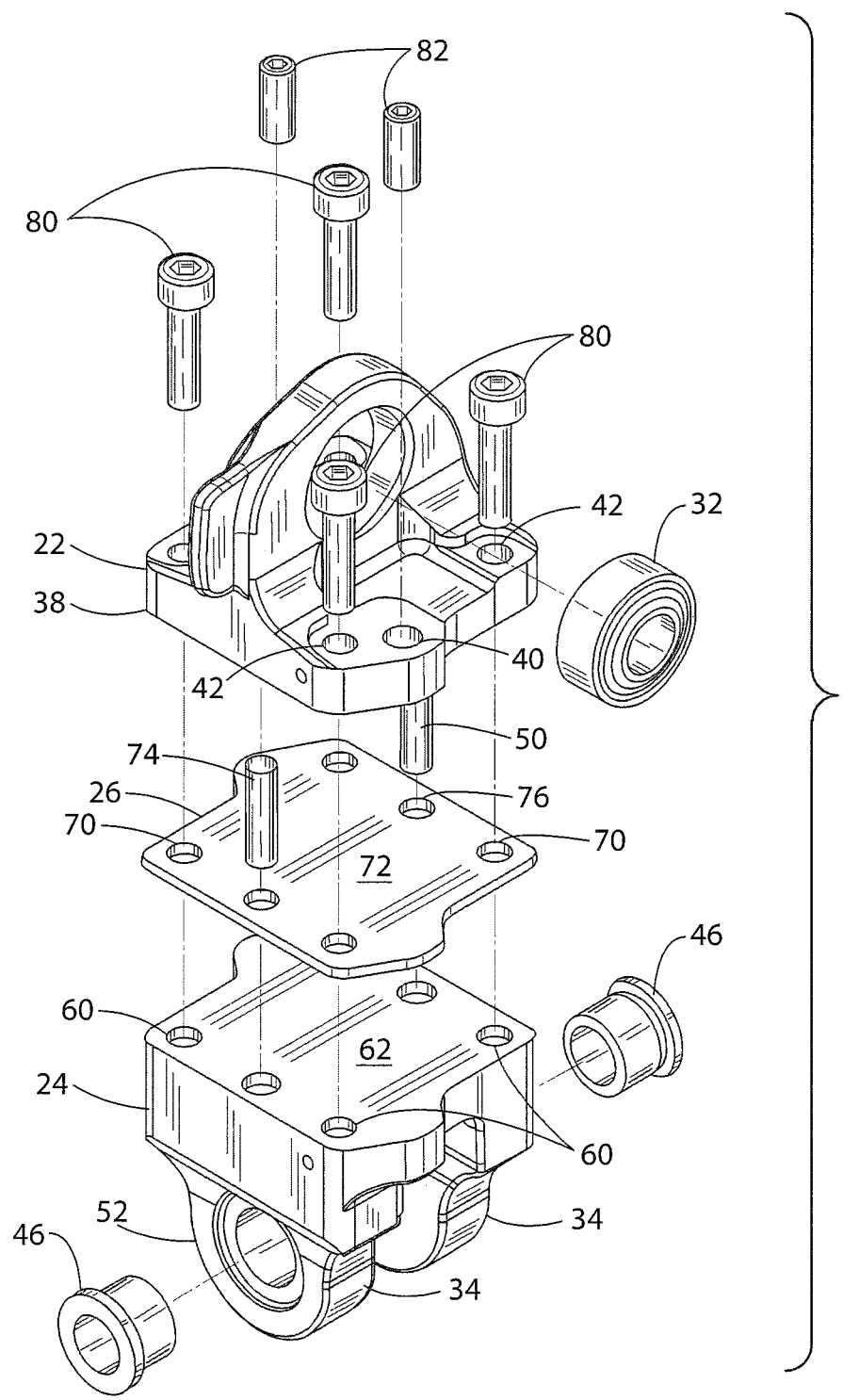
FIG. 3 is an exploded, side perspective view of the adjustable zero-moment support embodiment in FIG. 2.

FIG. 3 is an exploded view of the embodiment in FIG. 2 showing the components of the upper fitting 22, the compression bearing plate 28 and the lower fitting 24. The upper fitting 22 has at least one threaded aperture 40 and at least one non-threaded aperture 42. For instance, as depicted in FIG. 3, the upper fitting 22 has two threaded apertures 40 (with one threaded aperture 40 being hidden from view) and four non-threaded apertures 42 (again, with two non-threaded apertures 42 hidden from view). As shown, fasteners may protrude through these apertures to retain the compression bearing plate 28 and the lower fitting 24. The fasteners may be a variety of bolts, pins and the like. Typically, the fasteners include at least one tension fastener 80 and at least one compression fastener 82 as discussed hereinafter. As shown in this particular example, four tension fasteners 80 are fastened within the four non-threaded apertures 42. Similarly, in this particular example, two compression fasteners 82 are fastened within the two threaded apertures 40.

As shown in FIG. 3, the upper fitting 22 includes a link assembly 30 on its upper side and a connecting face 38 to connect with the compression bearing plate 26 on its lower side. The link assembly may be a spherical bearing, fork bearing or the like. As shown in this example, the link assembly 30 is a spherical bearing 32, which generally supports a rotating shaft of the antenna assembly, thereby permitting angular rotation about the central point in two orthogonal directions. Further, the connecting face 38 may be substantially flat, or comprise substantially flat segments that correspond to opposing flat segments on the opposing side. In this example, the connecting face 38 includes a guide pin 50 for generally guiding the upper fitting 22 and the compression bearing plate 26 into position. In other examples, those of ordinary skill in the art will recognize that a variety of guiding pins or the like may enhance the positioning of the elements described herein.

The compression bearing plate 26 is sized to fit between the opposing upper fitting 22 and the lower fitting 24 to generally absorb compression forces from the compression fasteners 82. As shown, the compression bearing plate 26 may include tension apertures 70 and at least one compression bearing platform 72. The tension apertures 70 on the compression bearing plate 26 generally align with the tension apertures 42 on the upper fitting 24 in an assembled position. For instance, the apertures align to allow a fastener to protrude there through. The compression bearing plate 26 also includes the compression bearing platform 72 having compression sites, for instance on opposing ends of the compression bearing plate that generally provide support for the compression fasteners 82 from the upper fitting 22.

As further shown from the example in FIG. 3, the compression bearing plate 26 may have a guide pin aperture 76 that aligns with the guide pin 50 on the upper fitting 22. Also, the compression bearing plate 26 may include a guide pin 74 itself to mate with a corresponding guide pin aperture 76 on the connecting face 38 of the upper fitting 22. Generally, the compression bearing plate 26 is constructed of rigid material to absorb the compressive forces exerted by the compression fasteners and the like.

The lower fitting 24 includes a connecting face 62 to mate with the compression bearing plate 26 and a link assembly 52. The lower fitting 24 includes at least one threaded aperture 60 to receive and secure a tension fastener 80. As shown in this example, the connecting face 62 includes four threaded apertures 60 (with the rear corner threaded aperture hidden from view) to receive and secure the four tension fasteners 80. Other examples include the connecting face 62 having two opposing threaded apertures 60. In an assembled position, the tension fasteners 80 that protrude through the tension apertures 42 on the upper fitting 24, the compression bearing plate 26 and the threaded apertures 60 on the lower fitting 24 generally produce a tension force on the adjustable zero moment support 12.

Similar to the upper fitting 22, the link assembly 52 of the lower fitting 24 may be a spherical bearing, fork bearing or the like. As shown in this example, the link assembly 52 is a fork bearing 34 having opposing, spatially-separated bearings 46. Typically, the spatially-separated bearings include roller bearings.

FIGS. 4A and 4B further illustrate the combination of tension and compression forces on the adjustable zero-moment support, which provides a shortened profile from traditional structures to better fit within tight installation and maintenance clearances, as well as provides off-axis adjustment. As shown in this example in these figures, the upper fitting 22 and the lower fitting 24 are assembled together with the compression bearing plate 26 positioned between the opposing fittings. The tension fasteners 80 are positioned within the tension apertures 42 on the upper fitting 24, within the tension apertures 70 of the compression bearing plate 26 and finally fastened within the threaded apertures 60 on the lower fitting 24. This assembled position generally provides a tension force on the adjustable zero moment support 12.

As further shown in FIGS. 4A and 4B, a compression fastener 82 is positioned within the threaded aperture of the upper fitting 82. The distal end of the compression fastener 82 presses in compression against the compression bearing plate 26 in the assembled position. Those of ordinary skill in the art will recognize that the elements and features of the upper fitting and the lower fitting may be reversed to meet the zero-moment off-axis adjustment of a particular application. For exemplary purposes only, another embodiment includes a lower fitting with at least one tension aperture and at least one compression aperture. In this embodiment, a compression fastener may protrude through the threaded aperture the lower fitting and the press against the compression bearing plate in compression. Therefore, the elements may be reversed to meet the orientation and/or clearance restrictions of a particular application.

FIG. 5 illustrates yet another view of an assembled adjustable zero-moment support. As shown, the tension fasteners 80 are positioned within the tension apertures 42 on the upper fitting 24. Further, the compression fastener 82 is positioned within the threaded aperture of the upper fitting 82. Further, the link assembly 30 includes the guide fin 44. Other examples of the assembled adjustable zero-moment support may be a variety of shapes, styles, and sizes for the convenience of its user, in particular the maintenance personnel assembling the adjustable zero-moment support 12 in a tight clearance area of an antenna assembly on an aircraft.

Figure 6:
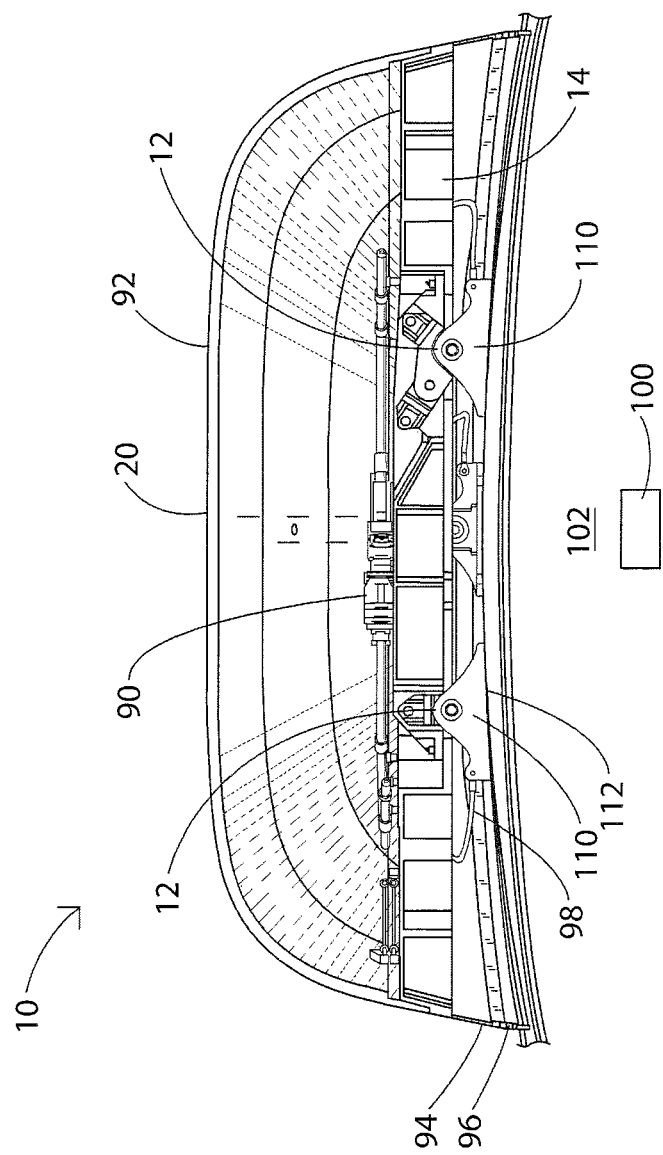
FIG. 6 is a schematic view of one particular application of an adapter assembly positioned on an aircraft according to an embodiment of the inventions.

FIG. 6 is a schematic view of one particular embodiment of an adapter assembly 10 positioned on an aircraft 102. The antenna assembly 20 may include an aircraft antenna 90 with global communications systems, radars, antennas, associated antenna cables/electrical connectors 98 to the airplane and the like to the receiver transmitter 100. Further, a radome 92 may protect the antenna assembly as described herein and understood by those skilled in the art having the benefit of the present disclosure. A skirt 94 may be positioned at the lower portion of the radome 92. In some examples, the skirt 94 may include hard portions and soft portions to further seal 96 the protected antenna assembly 20 to the aircraft 102, for instance to the fuselage skin 112. As shown, the zero-moment supports 12 are secured to the aircraft-side fittings 110, so that the top and bottom sections of the antenna assembly 20 now may move in any direction while still transferring load.

Figure 7:
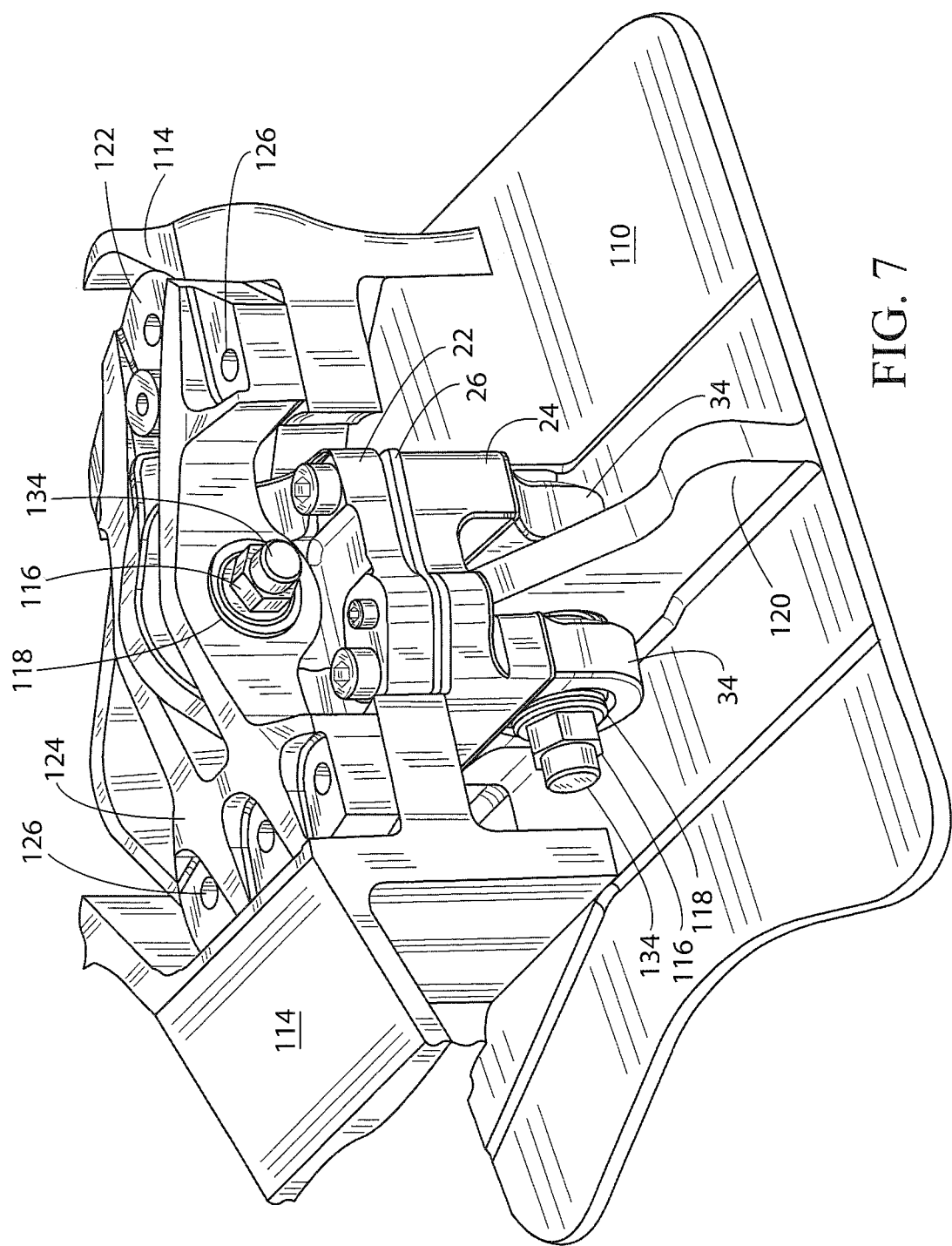
FIG. 7 is an isolated, side perspective view of one adapter assembly in FIG. 6.

FIG. 7 illustrates an isolated view of one example of the adjustable zero-moment support shown in FIG. 6 secured between an adapter plate and an aircraft-side fitting 110. As shown, an adapter plate fitting 124 is positioned between the adjustable zero-moment support and the upper surface 114 of the adapter plate. The adapter plate fitting 124 may include fastener apertures 126 to secure the adapter plate fitting 124 and the adapter plate. Other examples may be fastened in a variety of ways, including other fasteners, welds and the like. Further, the adapter plate fitting 124 may include a zero-moment fitting guide 122. As shown, the adapter plate fitting 124 may include an attachment opening 118 to generally receive and retain a fastener to secure the upper end of the adjustable zero-moment support. The fastener shown in FIG. 7 is an upper bolt 134 and nut 116 fastening system. This fastening system shown allows quick and convenient assemblage and/or maintenance. However, other fastening systems include a variety of fastening devices, welds and the like. Further embodiments include a variety of other support member configurations between the adjustable zero-moment support and the adapter plate, including examples with no support members, i.e. no adapter plate fittings, between the adjustable zero-moment support and the adapter plate.

This example of the adjustable zero-moment support includes an upper fitting 22 body, a lower fitting 24 body and a compression bearing plate 26 therebetween. As additionally shown in FIG. 7, the lower portion of the adjustable zero-moment support is secured to the aircraft-side fitting 110. The aircraft-side fitting 110 may include a raised support 120 to mate with the link assembly of the lower fitting 24 body. As shown, the link assembly may be a fork bearing 34 and the raised support 120 may be secured between the opposing forks. However, other embodiments include spherical bearings and the like as discussed and shown herein. In some examples, the raised support 120 may have an aperture to receive and retain a fastening system to secure the lower fitting 24 of adjustable zero-moment support to the aircraft-side fitting 110. Similarly, the link assembly may include a corresponding aperture 118 to receive and retain a fastening system. As shown in FIG. 7, the fastening system includes a lower bolt 134 and nut 116 fastening system. This fastening system shown allows quick and convenient assemblage and/or maintenance Again, however, other fastening systems include a variety of fastening devices, welds and the like.

In other embodiments, the inventions include an adjustable zero-moment support kit. In this embodiment, the kit may comprise an upper fitting 22, e.g. any of the upper fitting examples and embodiments previously shown or described. Further, the kit may include a lower fitting 24, e.g. any of the lower fitting examples and embodiments previously shown or described. In addition, the kit may include a compression bearing plate 26, e.g. any of the compression bearing plate examples and embodiments previously shown or described. In particular examples, the kit may include a variety of tension fasteners and/or compression fasteners, e.g. any of the fasteners previously shown or described.

Numerous characteristics and advantages have been set forth in the foregoing description, together with details of structure and function. Many of the novel features are pointed out in the appended claims. The inventions, however, is illustrative only, and changes may be made in detail, especially in matters of shape, size, and arrangement of parts, within the principle of the inventions, to the full extent indicated by the broad general meaning of the teens in which the general claims are expressed. It is further noted that, as used in this application, the singular forms "a," "an," and "the" include plural referents unless expressly and unequivocally limited to one referent.

I claim:

1. An adjustable zero-moment support assembly for connecting two mounting points to transfer load in a spatially confined area, the assembly comprising:
   (a) an upper fitting comprising at least one threaded aperture with a compression fastener having threads at a proximate portion, and wherein said compression fastener's threads retained in corresponding threads of said threaded aperture,
   and at least one non-threaded aperture adjacent said at least one threaded aperture with a tension fastener having threads at a distal portion and a threadless proximate portion, wherein said tension fastener's threadless proximate portion protrudes through said non-threaded aperture; and
   (b) a lower fitting comprising at least one threaded aperture,
   wherein said upper fitting and said lower fitting are positioned together about a compression bearing plate with an off-axis adjustment, and
   wherein said tension fastener's distal portion threads retained in corresponding threads of said lower fitting's threaded aperture,
   and wherein a distal portion of said compression fastener aligned outside of said lower fitting.

2. The assembly of claim 1, wherein said upper fitting includes a link assembly.

3. The assembly of claim 2, wherein said link assembly is a link chosen from a spherical bearing, a fork bearing and combinations thereof.

4. The assembly of claim 1, wherein said upper fitting includes a guide fin.

5. The assembly of claim 1, wherein said upper fitting includes a connecting face.

6. The assembly of claim 5, wherein said connecting face further includes at least one guide pin.

7. The assembly of claim 1, wherein said lower fitting includes a link assembly.

8. The assembly of claim 7, wherein said link assembly is a link chosen from a spherical bearing, a fork bearing and a combination thereof.

9. The assembly of claim 7, wherein said link assembly is a fork bearing having opposing spatially separated bearings.

10. The assembly of claim 1, wherein said lower fitting further including a plurality of said threaded apertures.

11. The assembly of claim 1, wherein said plurality of threaded apertures are adapted to receive a fastener and exert tension on said assembly.

12. The assembly of claim 1, wherein said lower fitting includes a connecting face.

13. The assembly of claim 1, wherein said compression bearing plate includes a plurality of tension apertures.

14. The assembly of claim 13, further including a plurality of tension apertures adapted to protrude through said compression bearing plate.

15. The assembly of claim 14, wherein said compression bearing plate further includes at least one compression bearing platform.

16. The assembly of claim 15, wherein said compression bearing plate includes two compression bearing platform sites on opposing sides of said compression bearing plate.

17. The assembly of claim 1, wherein a guide pin is attached to a portion chosen from the upper fitting and the lower fitting.

18. The assembly of claim 1, wherein said compression bearing plate includes a guide pin aperture adapted to receive a corresponding guide pin.

19. The assembly of claim 1, further including two compression bolts.

* * * * *